United States Patent Office 3,130,200
Patented Apr. 21, 1964

---

3,130,200
PREPARATION OF THE TETRAESTERS
OF PENTAERYTHRITOL
Etienne Barbry, Lille, Nord, France, assignor to Boyer &
Cie, Paris, France, a company of France
No Drawing. Filed Jan. 11, 1961, Ser. No. 81,927
Claims priority, application France Jan. 15, 1960
4 Claims. (Cl. 260—340.2)

The present invention has for its object a process or method of preparation of tetraesters of pentaerythritol of the formula:

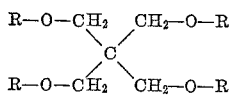

in which R is selected from the group consisting of the acetyl radical, the propionyl radical, the butyryl radical, the succinyl radical and the phthalyl radical.

The compounds mentioned, when prepared according to the process of the invention, can be obtained in a state of very great purity and with a much higher yield than has hitherto been obtained by means of known methods.

The process in accordance with the invention is mainly characterized in that a powerful mineral dehydrating agent, which is a mixture of pure sulphuric acid and of oleum containing 20% of sulphuric anhydride, is employed as a catalyst.

Preferably the 20% oleum content of the catalyst is in the range of about 25% to about 50% of the total weight of the catalyst.

In a particular form of embodiment of the present invention, the first phase of the process consists in preparing an esterifying mixture constituted by the acid anhydride which corresponds to the ester to be obtained and a volume of catalyst which is approximately 0.5 to 3% of the volume of the acid anhydride, this mixture being brought to the temperature of esterification, the said temperature being easily predetermined once and for all in the case of each of the esters contemplated.

The second phase of the process consists in introducing into this mixture finely crushed pentaerythritol, this introduction being effected by spraying in a shower at intervals of time which can vary between 30 and 70 minutes. The reactional mixture can then be poured into cold water and the tetraester is then precipitated, hydro-extracted, washed, dried and recrystallized in a suitable alcohol.

The following examples are not given in any sense by way of limitation and certain modifications can be made to these examples without thereby departing either from the spirit or the scope of the present invention.

*Example 1.—Preparation of the Tetra-Acetylated Derivative of Pentaerythritol*

In a suitable reactor fitted with a cooling and re-heating device, a stirring system, a thermometer and a filling pipe, 200 grams (185 ml.) of pure acetic anhydride (density: 1.080) are introduced, the stirrer is put into operation, and there is then added a separately prepared mixture of 3.4 grams (1.85 ml.) of pure sulphuric acid at 66° Baumé (density: 1.84) and 1.15 grams (0.60 ml.) of a 20% oleum (density: 1.92).

The temperature is brought up to 40° C. and 40 grams of dry pentaerythritol are introduced as steadily as possible for a period of ¾ of an hour, while adjusting the temperature, which has increased to approximately 52° as a result of the reaction.

At the end of the introduction, the filling orifice is closed and the temperature of the reactional mixture is brought up to 60° C. and maintained at this level for one and a half hours.

When this period of time has elapsed, the mixture is cooled to room temperature, then poured into 2.5 liters of cold water while subjected to very rapid agitation by means of a stirrer.

The acid mother-liquors are then poured off and thrown away.

The product is again dispersed in 2.5 liters of cold water, then hydro-extracted, washed with plenty of water over the drying machine until there is hardly any acid reaction, the product thus obtained being then dried in a hot-air oven at a temperature which does not exceed 60° C.

The crude, dry product is dissolved while hot in 01.100 of isopropanol of 99% purity; as a result of cooling, the pure product crystallizes in fine needles. It is hydro-extracted then dried in a hot-air oven at a temperature which does not exceed 60° C.

The product thus obtained has a molecular weight of 304.

*Example 2.—Preparation of the Tetra-Propionylated Derivative of Pentaerythritol*

The conditions of preparation are the same as for the tetra-acetyl derivative, starting from 250 grams (247 ml.) of pure propionic anhydride (density: 1.016) which receive an addition of a separately prepared mixture of 2.5 grams (1.36 ml.) of pure sulphuric acid at 66° Baumé (density: 1.84) and 2.5 grams (1.30 ml.) of a 20% oleum (density: 1.92).

The temperature is brought to 100° C. and 40 grams of dry pentaerythritol are introduced as steadily as possible for a period of ¾ of an hour while maintaining the temperature in the vicinity of 100° C.

Upon completion of the introduction and closure of the filling orifice, the temperature is maintained at 95° C. by heating for a period of time lasting another one and a half hours.

The remainder of the operation is identical to that described in Example No. 1.

Methyl alcohol is preferably employed for the final recrystallization.

The product thus obtained has a molecular weight of 360.

The butyric, succinic and phthalic derivatives are prepared in a similar manner by starting from the corresponding anhydrides.

The temperatures of introduction of the pentaerythritol and the temperatures of digestion of the reactional mixture will become higher as the molecular weight of the anhydride employed is also greater. These temperatures can be easily determined by means of a preliminary test.

What I claim is:

1. A method of preparation of tetraesters of pentaerythritol of the formula:

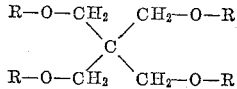

in which R is selected from the group consisting of acetyl, propionyl, butyryl and together form a member selected from the group consisting of succinyl and phthalyl, consisting in causing the organic acid anhydride corresponding to the ester to be obtained to react upon pentaerythritol, in the presence of a mixture of pure sulphuric acid and of oleum containing 20% of sulphuric anhydride as a catalyst.

2. A method as claimed in claim 1, wherein the volume of the catalyst is approximately 0.5 to 3% of the volume of the organic acid anhydride.

3. A method as claimed in claim 2, wherein the 20% oleum content of the catalyst is in the range of about 25% to about 50% of the total weight of the catalyst.

4. A method as claimed in claim 1, wherein there is first prepared an esterifying mixture constituted by the organic acid anhydride corresponding to the ester to be obtained and the catalyst, the said esterifying mixture is brought to the temperature of esterification, the finely crushed pentaerythritol is then introduced little by little into said mixture in the form of a sprayed shower, after digestion of the reactional mixture during a period of time of the order of one to two hours said mixture is cooled and the ester of pentaerythritol is precipitated by pouring said reactional mixture into cold water.

References Cited in the file of this patent

UNITED STATES PATENTS

| | | |
|---|---|---|
| 1,583,658 | Clarke | May 4, 1926 |
| 1,922,459 | Schmidt et al. | Aug. 15, 1933 |
| 1,946,202 | Gabriel et al. | Feb. 6, 1934 |
| 2,031,603 | Holt | Feb. 25, 1936 |
| 2,381,247 | Barth et al. | Aug. 7, 1945 |

FOREIGN PATENTS

| | | |
|---|---|---|
| 594,814 | Great Britain | Nov. 19, 1947 |